United States Patent [19]

Yee

[11] Patent Number: 4,834,415
[45] Date of Patent: May 30, 1989

[54] DUAL-SEAT FOLDABLE BABY CART

[75] Inventor: Bruce Yee, Taipei, Taiwan

[73] Assignee: Apexcel Co., Ltd., Taipei, Taiwan

[21] Appl. No.: 130,317

[22] Filed: Dec. 8, 1987

[51] Int. Cl.4 .............................................. B62B 7/08
[52] U.S. Cl. .................................... 280/644; 280/648;
280/658; 280/47.4
[58] Field of Search ............... 280/642, 643, 648, 650,
280/658, 644, 47.38, 47.39, 47.4

[56] References Cited

U.S. PATENT DOCUMENTS

| | | | |
|---|---|---|---|
| 2,872,203 | 2/1959 | Hedstrom | 280/47.4 |
| 4,597,116 | 7/1986 | Kassai | 280/642 |
| 4,632,421 | 12/1986 | Shamie | 280/642 |
| 4,706,986 | 11/1987 | Kassai | 280/642 |

Primary Examiner—David M. Mitchell
Attorney, Agent, or Firm—Browdy and Neimark

[57] ABSTRACT

A dual-seat foldable baby cart adapted for babies to sit in or lie down, basically consists of a commonly known baby cart structure with its two pairs of horizontal frames forward extending longer than a conventional baby cart, whereto a pair of front supporting legs tilting backwardly may be riveted near the front end at a proper position and an extra back frame and an extra foldable awning support assembly may be adequately connected and, thus providing additional room for the baby cart. Meanwhile, an angle adjusting device is installed at the connection where back frames and the lower pair of the horizontal frames of the baby cart are jointed so that the back frames may be adjustably tilted at different angles for babies either to sit in or to lie down. The whole baby cart is constructed in such a foldable form that the whole structure is operated by a pedal lever, easily folded or unfolded by simply stepping down the pedal lever.

4 Claims, 3 Drawing Sheets

DUAL-SEAT FOLDABLE BABY CART

BACKGROUND OF THE INVENTION

Since most baby carts commonly known are single-seated structure, it is an important object of the present invention to provide a dual-seat foldable baby cart having extra room for two babies. Another important object of the present invention is to provide a dual-seat foldable baby cart equipped with an angle adjusting device so that the back frames of the baby cart may be tilted back at three different angles for two babies either to sit in or to lie down.

Still another important object of the present invention is to provide a dual-seat foldable baby cart having a foldable structure which enables the baby cart to be easily folded or unfolded by stepping down on a pedal lever.

BRIEF DESCRIPTION OF THE DRAWINGS

The invention itself, both as to its structure and its method of operation, together with additional objects and advantages thereof, will become apparent during the course of the following description wherein.

DETAILED DESCRIPTION OF THE INVENTION

Figure 1:
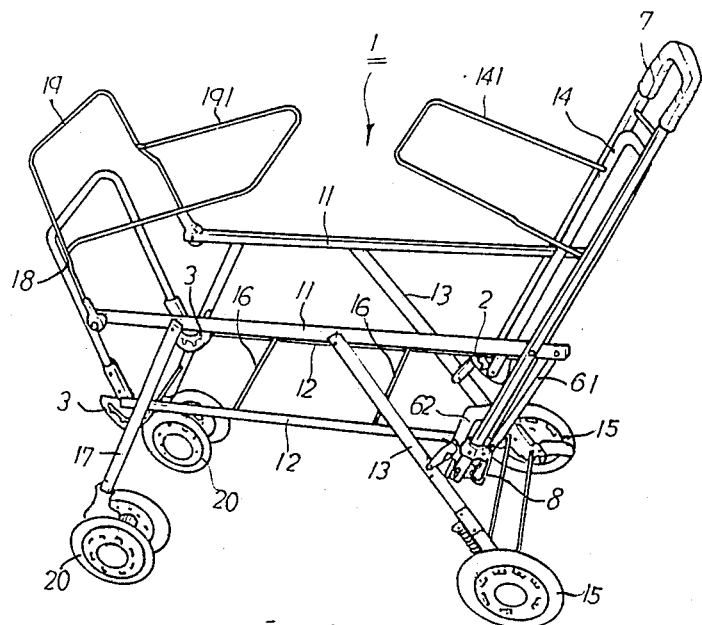
FIG. 1 is a three-dimensional perspective of the skeleton of the present invention.
Figure 2:
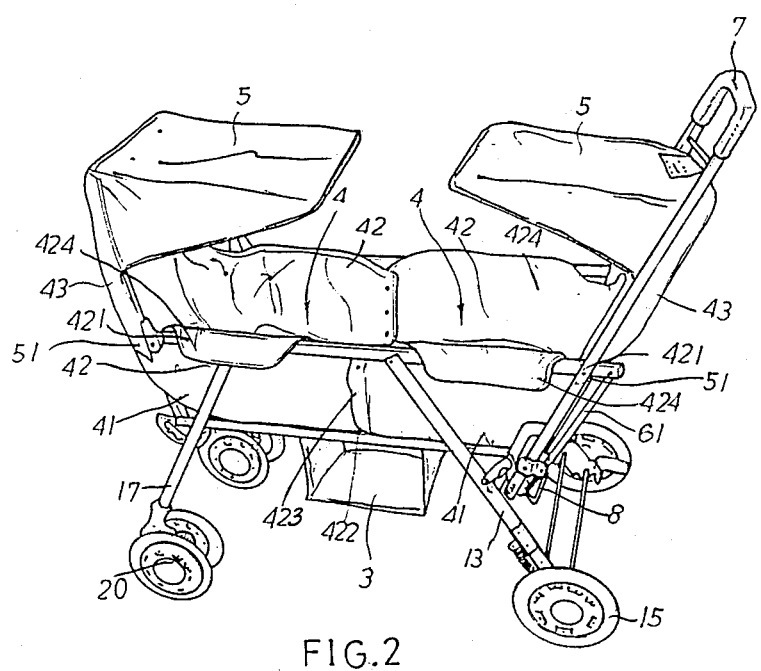
FIG. 2 is a three-dimensional perspective of a complete dual-seat foldable baby cart of the present invention.

A complete dual-seat baby cart framework 1 consists of two horizontally parallel upper frames 11 and lower frames 12, thereto a pair of rear supporting legs 13 tilting backwardly are riveted to pivotally connect with a pair of rotatable rear wheels 15. A back frame 14 tilting backwardly is also riveted to the lower frames 12 and may further pivotally connect with an awning support 141 on which an awning 5 is covered. A push handle 7 is pivotally connected to the rear supporting legs 13 with fixing arms 62 while it is also pivotally riveted to the upper frames 11 at their crossing.

The upper and the lower frames 11, 12 extend forwardly to permit a pair of front supporting legs 17 to tilt backwardly for pivotally connecting castered front wheels 20, and a second tilting back frame 18 to be riveted and pivotally connected, respectively, to positions near the front end of the upper and the lower frames 11 & 12. An awning support assembly consisting of a stand 19 and a top support 191 is pivotally connected to the very front of the upper frames 11 to permit a second awning 5 to be covered thereon. The top support 191 is also pivotally connected to the stand 19.

Near every end of both back frames 14, 18, an angle adjusting device 2, 3 is installed at the connection where the back frames join the lower frames 12 for changing the tilt degrees of the back frames 14 and 18 respectively.

Two seats 4 are placed face to face onto the two upper frames 11, and each of which consists of a sponge bottom cushion 41, two protective sidepieces 42, and a protective back 43. By wrapping an upper extension 421 of every protective sidepiece 42 from above and around the upper frames 11 and snapping together the female and the male heads of two press studs 424 on each sidepiece 42, the seats 4 may be secured on the upper frames 11. Then, to connect the two seats 4 by snapping together the female head of three press studs 423 on every front extension 422 of the first seat 4 and the male head of the three press studs 423 on every front extension 422 of the second seat 4. In similar way, the protective backs 43 may be secured to the back frames 14 and 18 by wrapping two side extensions of every protective back 43 backwardly around the back frames 14 and 18 and snapping together the female and the male head of press studs on each protective back 43.

A U-shaped foot-receiver 30 may be hung up and disposed between two middle ones of four transverse links 16 which have been parallelly arranged to connect the two lower frames 12, and perpendicular to the same.

Both the awning supports 141 and 191 may support an awning-like covering 5 which may be firmly fastened to the support frame 141 and 191 by snapping a female press stud 51 at the lower end of the awning-like covering 5 onto a male press stud outside the protective back 43. Either the seats 4 or the covering 5 may be easily removed in a reverse manner.

Figure 4:
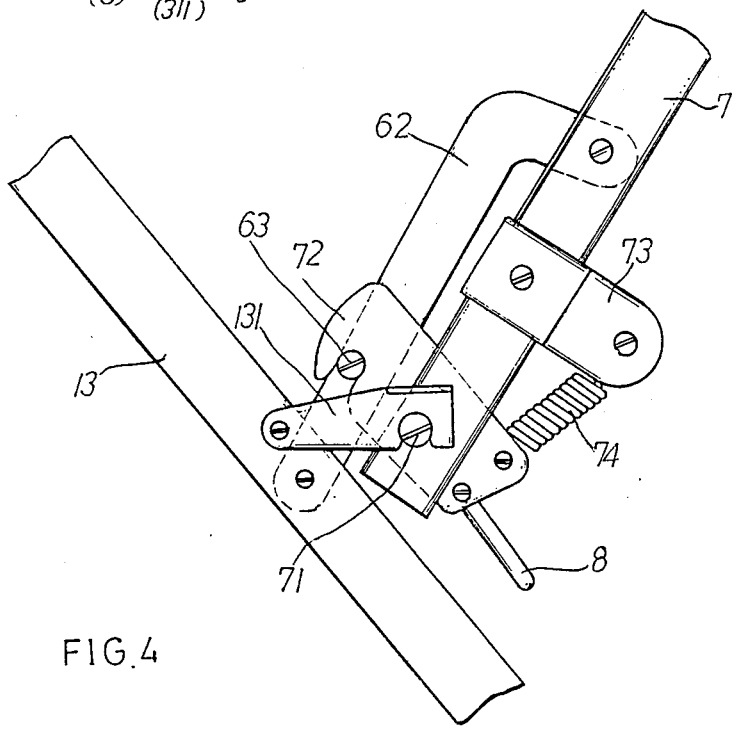
FIG. 4 is an enlarged, fragmentary side view illustrating how the push handle, the rear supporting legs and the pedal lever are connected with one another.
Figure 5:
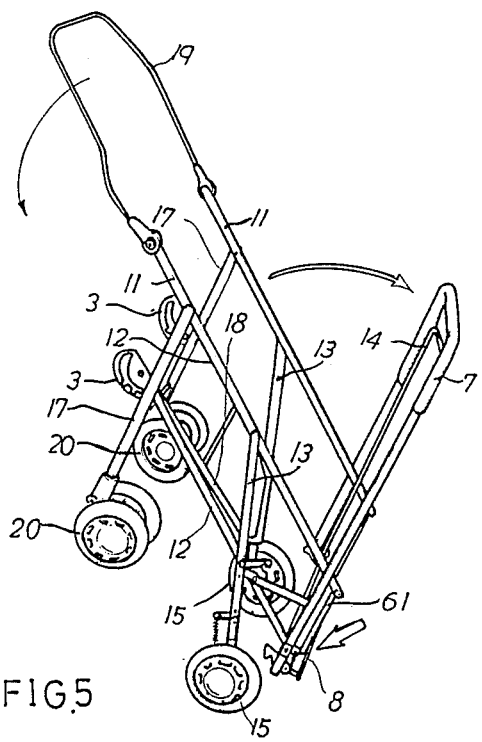
FIG. 5 is a three-dimensional perspective showing the course of folding a dual-seat foldable baby cart of the present invention.
Figure 6:
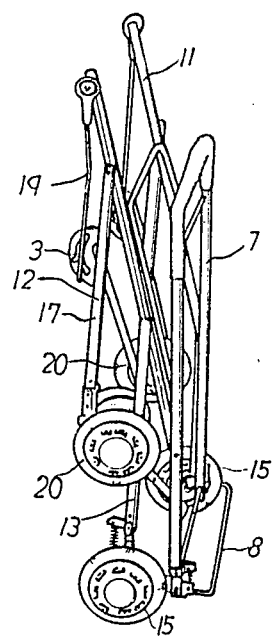
FIG. 6 is a three-dimensional view showing a completely folded dual-seat baby cart of the present invention.

Links 61 are longitudinally and pivotally installed on each side of the framework 1 in such a manner that they will connect the rear ends of the upper and lower frames 11 & 12. Pins 71 project from the outer lower ends of the push handle 7 (see FIG. 4), whereon a hook-like fastener 131 with one end pivotally fixed on the rear supporting legs 13 near its outer central point may hook so that the push handle 7 and the rear supporting legs 13 may firmly and tightly connected to each other.

Two fasteners 72 separately fixed at the inner lower ends of the push handle 7 may hook on and grip projecting pins 63 on the fixing arm 62 which are riveted to the push handle 7 at one end and to the rear supporting legs 13 at another end. In this manner, the push handle 7 will be much firmly connected to the rear supporting legs 13.

Link plates 73 are fixed to the outer lower ends of the push handle 7 at a position a little higher than the fasteners 72. A spring 74 is hooked on the link plate 73 at one end and on the fastener 72 at the other end.

A pedal lever 8 is riveted to the outer lower corner of the fastener 72 and will cause the second back frame 18, the awning support 191, and the front supporting legs 17 to lift upwardly and backwardly and get closer to the push handle 7, and finally cause the whole framework 1 to be folded into a body which occupies only very small room when the pedal lever 8 is stepped on and pushed downwardly. Since the folding system employed in the present invention has already been widely used in the prevailing baby carts, it is not necessary to describe it in details herein.

Figure 3:
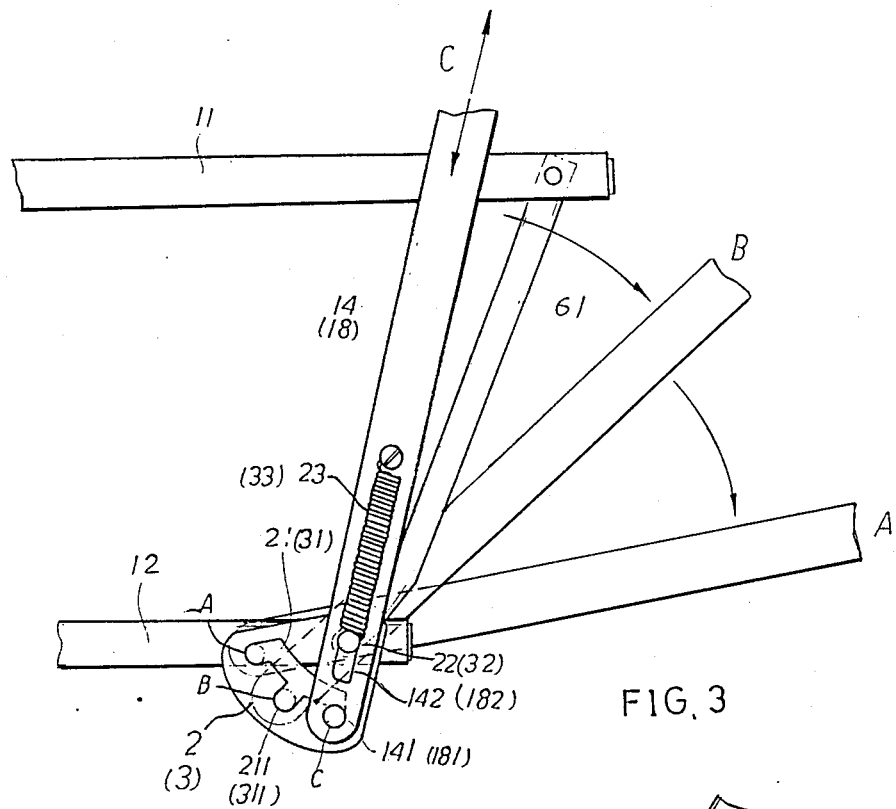
FIG. 3 is an enlarged, fragmentary sideview illustrating the relation between an angle adjusting device and the back frame, and also the course as to adjusting three different tilting angles of the back frame.

Angle adjusting devices 2 set on each joint of the back frames 14 and 18 with the lower frames 12, are sectorial plates (see FIG. 3) with an arcuate groove 21 which further has three-stop-recesses 211A, 211B, and 211C formed on the side near the circumference. Pins 141 and 181 on the lower ends of the back frames 14 and 18 respectively may be inserted into the arcuate grooves 211 and will cause the back frames 14 and 18 lying in an almost horizontal position, tilting at an angle about 45 degrees, or tilting at an angle about 15 degrees when they slide along the grooves 211 and fall into the stop-recesses 211A, 211B or 211C, respectively.

Oblong slots 142 and 182 are formed at the outer lower side of the back frames 14 and 18 and may receive projecting heads 22 fixed on the lower frames 12. A spring 23 may be hooked on a stud fixed to the back frames 14 and 18 at a proper position higher than the oblong slots 142 and 182 while its other end is hooked on the projecting heads 22. The oblong slots 142 and 182 and the springs 23 will together permit the back frames 14 and 18 to be shifted up and down and, consequently causes the pins 141 and 181 to slide along the arcuate grooves 211 and fall into the stop-recess 211A, 211B or 211C, according to the user's option.

What is claimed is:

1. A dual-seat foldable baby cart for babies to sit in or lie down comprising:

two horizontally parallel upper frames extending forwardly;

two horizontally parallel lower frames extending forwardly and being parallel to said upper frames;

an inverted U-shaped push handle having a pin at each of its lower ends and a link plate fixed at a position a little higher than said pin, said push handle being rotatably fixed to the rear end of said upper frames;

two parallel front supporting legs having upper ends riveted to said upper frames separately, a middle portion connected to said lower frames in such a manner that they will slightly tilt backwardly and the lower ends being connected to two castered front wheels;

two parallel rear supporting legs having upper ends riveted to said upper frames separately in such a manner that they will slightly tilt forwardly and lower ends connected to two rotatable rear wheels;

two fixing arms connected at one end to the lower ends of the push handle and at another end to each rear supporting leg;

two fasteners each having one end rotatably connected to an inner lower end of said push handle for connecting the push handle to the rear supporting legs;

a rear back frame bine connected at first joints to the rear ends of said lower frames with an angle adjusting means installed on each such first joint, and pivotally connected to an awning support near its top to be covered by an awning-like covering;

a front back frame being connected at second joints to the other ends of said lower frames with an angle adjusting means installed on each such second joint;

four transverse links being parallelly arranged to connect said two lower frames and being perpendicular to the same;

two sponge seat cushions both including two protective sidepieces and a protective back, and being able to be placed face-to-face and secured on said two upper frames, said protective sidepieces being wrapped around said two upper frames and press studs fixed on laterally adjacent surfaces of each seat to join the two seat cushions together at proper positions being snapped together;

a foot receiver having a U-shaped contour and being able to be hung up and disposed between said two middle transverse links;

a spring having one end connected to a rear upper corner of said fastener and the opposite end of said spring being connected to said link plate; and means to actuate the movement of folding said dual-seat foldable baby cart comprising a pedal lever attached to a rear lower corner of said fastener.

2. A dual-seat foldable baby cart as claimed in claim 1, wherein said angle adjusting means is a sectorial plate having an arcuate groove while three-stop recesses are formed on the groove side near the circumference for a pin outwardly projecting from the lower ends of said front and said rear back frames to insert in and to be checked thereto so as to enable the back frames to tilt at different angles.

3. A dual-seat foldable baby cart as claimed in claim 1, wherein each said rear supporting leg has a hook-like fastener riveted near its middle section for hooking on and gripping said pin outwardly projecting from the lower end of said push handle so as to firmly connect with said push handle.

4. A dual-seat foldable baby cart as claimed in claim 1, wherein said fasteners rotatably connected to each of said pins at the inner lowr ends of said push handle is adapted to hook and grips a pin outwardly projecting from each of said fixing arms.

* * * * *